US008922493B2

(12) United States Patent
Kim (10) Patent No.: US 8,922,493 B2
(45) Date of Patent: Dec. 30, 2014

(54) APPARATUS AND METHOD FOR AUTOMATIC ENABLEMENT OF A REAR-FACE ENTRY IN A MOBILE DEVICE

(76) Inventor: Christine Hana Kim, San Jose, CA (US)

( * ) Notice: Subject to any disclaimer, the term of this patent is extended or adjusted under 35 U.S.C. 154(b) by 946 days.

(21) Appl. No.: 12/885,572

(22) Filed: Sep. 19, 2010

(65) Prior Publication Data

US 2012/0068936 A1 Mar. 22, 2012

(51) Int. Cl.
*G06F 3/02* (2006.01)
*G09G 5/00* (2006.01)
*G06F 3/041* (2006.01)
*G06F 3/0489* (2013.01)
*H04M 1/23* (2006.01)
*G06F 1/16* (2006.01)
*G06F 3/0488* (2013.01)
*G06F 3/14* (2006.01)
*H04M 1/67* (2006.01)

(52) U.S. Cl.
CPC ............. *G06F 3/0489* (2013.01); *H04M 1/236* (2013.01); *G06F 3/021* (2013.01); *G06F 1/1626* (2013.01); *G06F 1/1643* (2013.01); *G06F 1/1647* (2013.01); *G06F 1/1662* (2013.01); *G06F 3/02* (2013.01); *G06F 3/04886* (2013.01); *G06F 1/1632* (2013.01); *G06F 3/1431* (2013.01); *H04M 2250/16* (2013.01); *H04M 1/23* (2013.01); *H04M 1/67* (2013.01); *H04M 2250/12* (2013.01)
USPC .......................................... 345/169; 156/173

(58) Field of Classification Search
CPC ... G06F 3/1423; G06F 3/1431; G06F 3/0219; G06F 3/0202; G06F 3/021; G06F 3/04886; G06F 3/0489; G06F 1/1613; G06F 1/1632; G06F 1/1647; G06F 1/1649; G06F 1/1662; H04M 1/236; H04M 1/667; H04M 1/67; H04M 2250/16; H04M 2250/18
USPC ........................ 345/156–173; 348/14.08, 115; 341/22–34; 340/407.1–407.2; 250/208.1; 455/550.1; 235/375; 708/100; 361/679.27, 679.01; 400/472; 715/702; 382/117
See application file for complete search history.

(56) References Cited

U.S. PATENT DOCUMENTS 5,410,333 A * 4/1995 Conway .......................... 345/169
5,949,643 A * 9/1999 Batio ......................... 361/679.27

(Continued)

OTHER PUBLICATIONS

James Scott et al., "RearType: Text Entry Using Keys on the Back of a Device", MobileHCI 2010 Sep. 7, 2010, Lisbon, Portugal. A full English text of this NPL is submitted by way of this IDS.

*Primary Examiner* — Dwayne Bost
*Assistant Examiner* — Darlene M Ritchie
(74) *Attorney, Agent, or Firm* — Invent Capture, LLC.; Samuel S. Cho (57) ABSTRACT

The present invention discloses one or more embodiments of a mobile device capable of automatic enablement of a rear-face data entry. In a preferred embodiment of the invention, the mobile device can automatically detect and determine that a rear-face data entry interface is either facing up or facing the user's line of sight, which prompts activation of the rear-face data interface for immediate enablement of data entry (e.g. typing). If the rear-face data entry interface is either facing down or away from the user's line of sight, the mobile device disables the rear-face data interface for data entry to minimize accidental and undesirable data entry via the rear-face data interface. The preferred embodiment of the invention also incorporates a primary frontal touch-screen display, a secondary rear touch-screen display, a QWERTY keyboard, and display elevation guards on both displays.

6 Claims, 10 Drawing Sheets

(56) References Cited

U.S. PATENT DOCUMENTS

| | | | |
|---|---|---|---|
| 6,243,727 B1* | 6/2001 | Watts, Jr. | 708/100 |
| 6,297,752 B1* | 10/2001 | Ni | 341/22 |
| 6,483,930 B1* | 11/2002 | Musgrave et al. | 382/117 |
| 7,088,342 B2* | 8/2006 | Rekimoto et al. | 345/169 |
| 8,423,076 B2* | 4/2013 | Kim et al. | 455/550.1 |
| 8,500,002 B2* | 8/2013 | Cohen et al. | 235/375 |
| 2002/0118175 A1* | 8/2002 | Liebenow et al. | 345/168 |
| 2004/0208681 A1* | 10/2004 | Dechene | 400/472 |
| 2005/0104855 A1* | 5/2005 | Grossmeyer | 345/169 |
| 2005/0253814 A1* | 11/2005 | Ghassabian | 345/168 |
| 2006/0017692 A1* | 1/2006 | Wehrenberg et al. | 345/156 |
| 2006/0197750 A1* | 9/2006 | Kerr et al. | 345/173 |
| 2007/0188450 A1* | 8/2007 | Hernandez et al. | 345/158 |
| 2007/0277020 A1* | 11/2007 | Kelley | 712/38 |
| 2008/0122796 A1* | 5/2008 | Jobs et al. | 345/173 |
| 2008/0266389 A1* | 10/2008 | DeWind et al. | 348/115 |
| 2009/0037825 A1* | 2/2009 | Thrasher et al. | 715/748 |
| 2009/0046076 A1* | 2/2009 | Bychkov et al. | 345/173 |
| 2009/0289896 A1* | 11/2009 | Jacob | 345/158 |
| 2010/0045596 A1* | 2/2010 | De Leon | 345/157 |
| 2010/0091017 A1* | 4/2010 | Kmiecik et al. | 345/420 |
| 2010/0141588 A1* | 6/2010 | Kimura et al. | 345/169 |
| 2010/0177047 A1* | 7/2010 | Brenneman et al. | 345/173 |
| 2010/0182232 A1* | 7/2010 | Zamoyski | 345/157 |
| 2010/0188474 A1* | 7/2010 | Robinson et al. | 348/14.08 |
| 2011/0157055 A1* | 6/2011 | Tilley et al. | 345/173 |
| 2011/0161809 A1* | 6/2011 | Gilmour | 715/702 |
| 2011/0273374 A1* | 11/2011 | Wood et al. | 345/169 |
| 2011/0291946 A1* | 12/2011 | Mann et al. | 345/173 |
| 2012/0039021 A1* | 2/2012 | Karwan | 361/679.01 |
| 2012/0194418 A1* | 8/2012 | Osterhout et al. | 345/156 |
| 2013/0082928 A1* | 4/2013 | Kim et al. | 345/168 |

* cited by examiner

APPARATUS AND METHOD FOR AUTOMATIC ENABLEMENT OF A REAR-FACE ENTRY IN A MOBILE DEVICE

BACKGROUND OF THE INVENTION

The present invention generally relates to a portable electronic device. More specifically, the present invention relates to an apparatus and a method for automatic enablement of a rear-face data entry in a mobile device.

Various mobile devices such as cellular phones, tablet devices (e.g. tablet personal computers), portable multimedia players, and navigation systems increasingly utilize touch-screen virtual keyboards for text and other data entry. A typical "smart-phone" device or a tablet device in the market is either equipped with a physical keyboard or a touch-screen virtual keyboard on a front surface of the device. These devices typically suffer from some space limitations on the front surface for positioning the physical keyboard or the touch-screen virtual keyboard, because a good portion of the front surface may be dedicated to display of images and graphics. The space limitations on the front surface may result in ergonomically inferior keyboard and other inconvenient data entry configurations, examples of which include a size reduction of each key (i.e. on a physical keyboard or a touch-screen virtual keyboard), a crowded data entry interface, and a reduced number of functional keys. If the size of each key is reduced significantly and/or if the data entry interface is overly crowded, a user may not be able to perform "touch-typing" or all-finger typing ergonomically possible on a full-size keyboard.

It is interesting to note that mobile devices in the market today do not utilize their rear surface areas, because the rear surface areas are typically only used as battery covers. If a designer of a mobile device utilizes a rear surface for accommodating a physical keyboard or a touch-screen virtual keyboard, the space constraints of placing a keyboard on a front surface of the mobile device may be alleviated. For example, a landscape aspect-ratio configuration of a keyboard on a rear surface of the mobile device can accommodate a full-size or larger keyboard as physical keys or touch-screen virtual keys, because a larger portion or an entire portion of the rear surface can be dedicated to accommodate the keyboard, unlike the front surface, which typically integrates a large display area. However, if both the front surface and the rear surface of a mobile device have data entry interfaces such as one or more touch screens and keys, then erroneous or accidental data entry may become a common and annoying problem because a user's fingers or another object may frequently brush against a surface integrating a data entry interface which is not in line of sight with the user. Even if a mobile device is equipped with a manual lock for a data entry interface (e.g. on a rear surface), the mobile device is still prone to accidental, unintended, or erroneous data entry by fingers or objects touching the rear surface of the mobile device when the manual lock is not active.

For example, a user facing a front surface of a mobile device hand-held by the user may accidentally touch a rear-surface data entry interface when a manual touch-screen input lock feature is inactive. The inherent likelihood of accidental data entry into the mobile device with both front and rear surface data entry interfaces may discourage device manufacturers from integrating a physical keyboard or a touch-screen virtual keyboard on a rear surface of the mobile device.

Therefore, an apparatus and a method for automatic enablement and/or disablement of a rear-face data entry in a mobile device may be beneficial to improved usability and heuristics of a mobile device design.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a mobile device is capable of automatic enablement of a rear-face data entry. This mobile device comprises a CPU and a memory unit operatively connected to the CPU, a graphics unit operatively connected to the CPU; a front display unit operatively connected to the graphics unit; a rear display unit operatively connected to the graphics unit; a rear-face data entry interface, wherein the rear-face data entry interface includes a physical keyboard or a virtual keyboard on a touch screen; and an automatic rear-face data entry interface enable/disable sensor capable of detecting whether the rear-face data entry interface is facing-up and/or facing a user's line of sight.

In another embodiment of the invention, a mobile device capable of automatic enablement of a rear-face data entry is also disclosed. This mobile device comprises a CPU and a memory unit operatively connected to the CPU; a graphics unit operatively connected to the CPU; a front display unit operatively connected to the graphics unit; a rear display unit operatively connected to the graphics unit; a battery operatively connected to the CPU, the graphics unit, the front display unit, and the rear display unit; a rear-cover data entry interface as a detachable rear-surface cover of the mobile device, wherein the rear-cover data entry interface includes a physical keyboard or a virtual keyboard touch screen which is attached to or detached from at least a portion of a rear surface of the mobile device; and an automatic rear-cover data entry interface enable/disable sensor capable of detecting whether the rear-cover data entry interface is facing-up or facing a user's line of sight.

Yet in another embodiment of the invention, a method for automatic enablement of a rear-face data entry in a mobile device is disclosed. This method comprises the steps of: turning on the mobile device with a rear-face or rear-cover data entry interface; checking whether a rear surface of the mobile device faces up or form a line of sight with a user; if the rear surface of the mobile device faces up and/or form the line of sight with the user: checking whether a rear-face manual lock is in "off" position, and if the rear-face manual lock is in "off" position: enabling data entry on the rear-face or rear-cover data entry interface; and if the rear surface of the mobile device does not face up and/or does not form the line of sight with the user: keeping the rear-face or rear-cover data entry interface disabled, or disabling the rear-face or rear-cover data entry interface if it is not already disabled.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more apparatuses and methods for automatic enablement of a rear-face data entry in a mobile device. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order and do not imply any limitations in the invention.

One aspect of an embodiment of the present invention is to provide a rear-face data entry interface, which may include a sizable keyboard, a keypad, and/or a touch-screen display. Another aspect of an embodiment of the present invention is to provide an automatic rear-face data entry interface enable/disable sensor capable of detecting whether the rear-face data entry interface is facing-up and/or facing a user's line of sight. Yet another aspect of an embodiment of the present invention is to provide a method of defining and recognizing a user's line of sight with a particular surface of a mobile device by using an embedded camera.

Furthermore, an additional aspect of an embodiment of the present invention is to enable or disable data entry to a rear-face data entry interface automatically, depending on a current position and/or a user's line of sight with the mobile device. In one embodiment of the invention, the current position of a data entry interface (e.g. a physical keyboard) may be detected by a gyroscopic sensor. Furthermore, in one embodiment of the invention, the user's line of sight with the mobile device may be detected and recognized by an embedded camera lens.

For the purpose of describing the invention, a term "data entry interface" is defined as a group of keys, buttons, or a touch-screen. One example of a data entry interface is a physical QWERTY keyboard. Another example of a data entry interface is a physical keypad. Yet another example of a data entry interface is a group of physical buttons or keys. Furthermore, a touch-screen interface which can display a virtual keyboard or a keypad layout is also a type of a data entry interface.

Furthermore, for the purpose of describing the invention, a term "automatic rear-face data entry interface enable/disable sensor" is defined as a sensor capable of detecting whether a rear-face data entry interface is facing up and/or facing a user's line of sight, and enabling or disabling the rear-face data entry interface accordingly. Typically, if the rear-face data entry interface is facing up, or facing the user's line of sight, the automatic rear-face data entry interface enable/disable sensor may enable the rear-face data entry interface. If, on the other hand, the rear-face data entry interface is facing down or away from the user's line of sight, then the automatic rear-face data entry interface enable/disable sensor may disable the rear-face data entry interface. One example of an automatic rear-face data entry interface enable/disable sensor is a gyroscopic or position sensor capable of detecting whether a particular surface on a mobile device is facing up or down. Another example of an automatic rear-face data entry interface enable/disable sensor is an embedded camera with a camera lens to detect or recognize a user's eyes while the user is staring into a rear surface of a mobile device. These two examples or other appropriate sensors may be used in combination to have an effect of a single automatic rear-face data entry interface enable/disable sensor.

Moreover, for the purpose of describing the invention, a term "rear-face" is defined as a rear surface of an electronic device. Furthermore, for the purpose of describing the invention, terms "rear-surface cover" and "rear-cover" are used to refer to a device cover on a rear surface. In a preferred embodiment of the invention, a detachable rear-surface cover may incorporate a rear-cover data entry interface.

In addition, for the purpose of describing the invention, a term "mobile device" is defined as a portable electronic device which, at a minimum, can display useful information via a display screen or a projected image. Typically, a mobile device also provides wireless communication, data storage, and computation capabilities. Examples of mobile devices include, but are not limited to, a cellular phone, a portable computer, a tablet device with one or more touch screens, and a portable game device.

Figure 1:
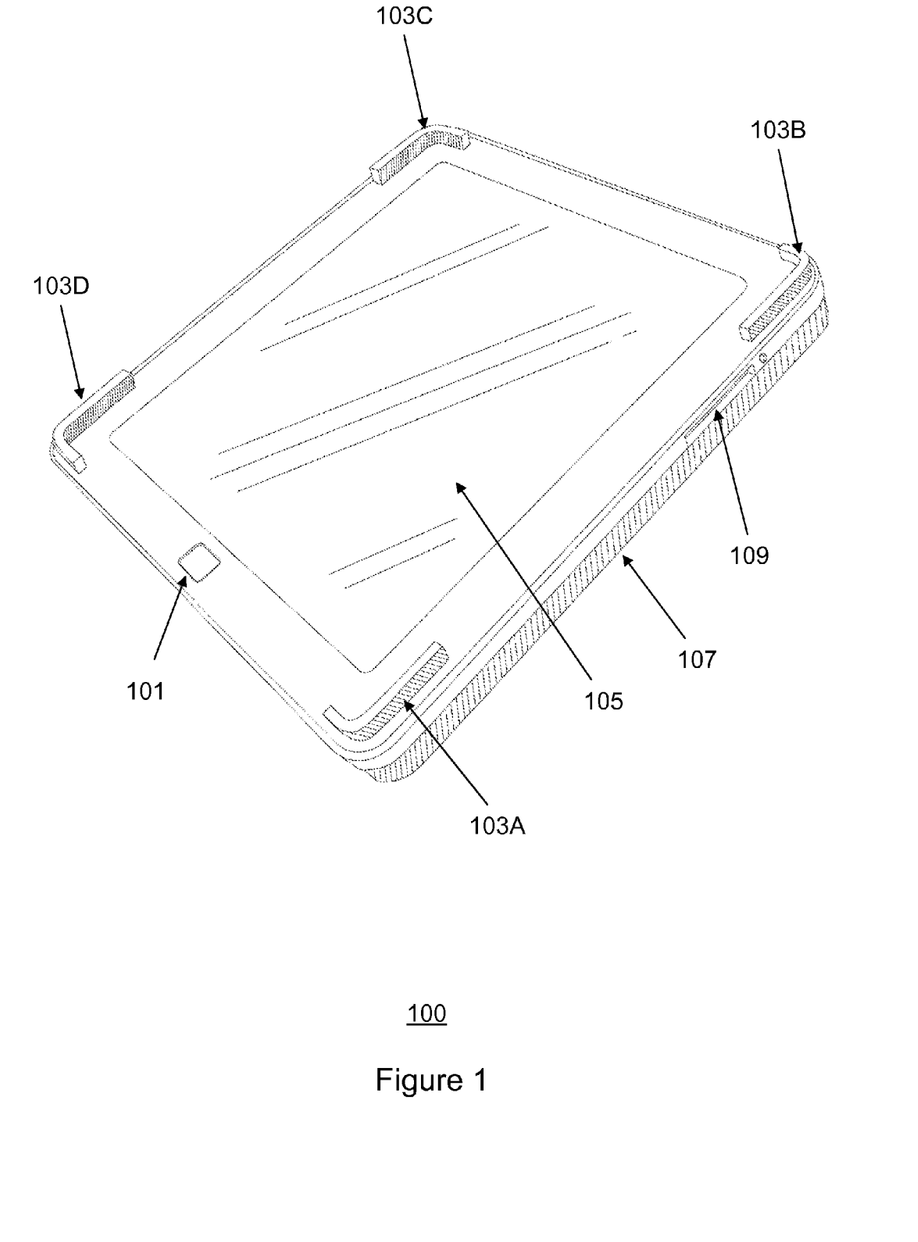
FIG. 1 shows a perspective frontal surface view of a mobile device capable of automatic enablement of a rear-face data entry in accordance with an embodiment of the invention.

FIG. 1 shows a perspective frontal surface view of a mobile device (100) capable of automatic enablement of a rear-face data entry in accordance with an embodiment of the invention. In one embodiment of the invention, a front surface of the mobile device (100) comprises a front display unit (105), one or more front display elevation guards (103A, 103B,

103C, 103D), and a power on/off button (101). In a preferred embodiment of the invention, the front display unit (105) may be a touch-screen display which may utilize liquid-crystal display (LCD), plasma, or OLED (Organic Light Emitting Diode) technology. The touch-screen display is generally configured to receive and recognize contact-based inputs from a user. In another embodiment of the invention, the front display unit (105) may be a non-touch-screen display unit which may be insensitive to contact-based inputs from the user.

Furthermore, in one embodiment of the invention, the front surface of the mobile device (100) may include buttons or keys other than what is shown in FIG. 1. The power on/off button (101) may also be placed at a different location from what is shown in FIG. 1, such as a side surface or a rear surface of the mobile device (100) in some embodiments of the invention. In a preferred embodiment of the invention, the one or more front display elevation guards (103A, 103B, 103C, 103D) provide protection against scratches and unintended contacts to the front display unit (105) when the front surface is facing down on a typically-flat solid surface. By providing an added height relative to the front display unit (105), the one or more front display elevation guards (103A, 103B, 103C, and 103D) prevent scratches and unintended contracts to the front surface when it is facing down. The one or more front display elevation guards (103A, 103B, 103C, 103D) can be made from rubber, metal, plastics, or a combination of such materials.

Continuing with FIG. 1, the mobile device (100) can also incorporate an external port (109) which may be an SD card slot, a USB port, or another type of I/O port configured to transmit data from the mobile device (100) to an external medium. The external port (109) may be placed on a side surface as shown in FIG. 1, or another surface of the mobile device (100) in other embodiments of the invention. Furthermore, the mobile device (100) may also have one or more rear display elevation guards (107). In a preferred embodiment of the invention, the one or more rear display elevation guards (107) provide protection against scratches and unintended contacts to a rear display unit, a rear-face data entry interface, and/or a rear-cover data entry interface when the rear surface is facing down on a typically-flat solid surface. By providing an added height relative to the rear display unit, the rear-face data entry interface, and/or the rear-cover data entry interface, the one or more rear display elevation guards (107) prevent scratches and unintended contacts on the rear surface. The one or more rear display elevation guards (107) can be made from rubber, metal, plastics, or a combination of such materials.

Figure 2:
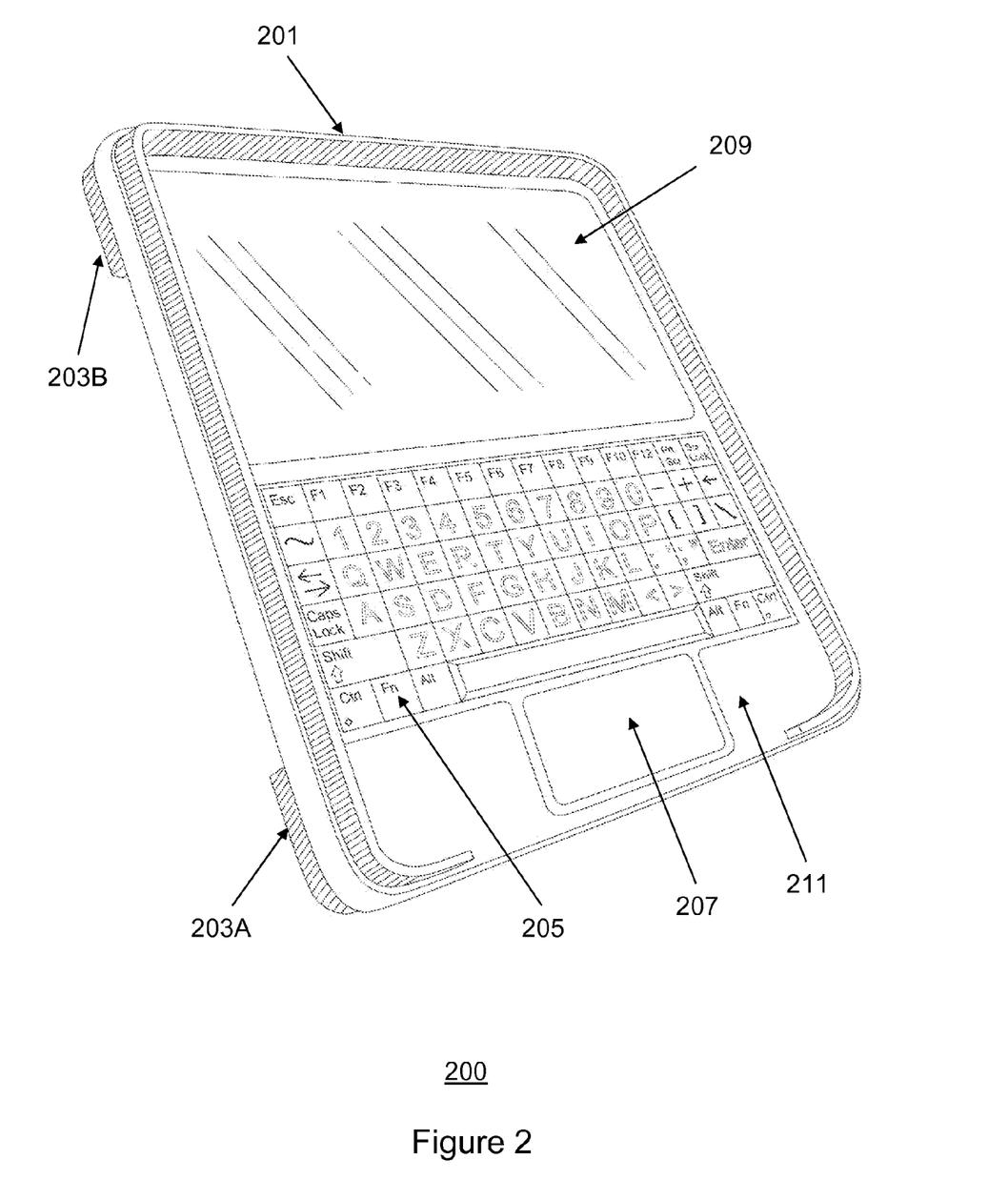
FIG. 2 shows a perspective rear surface view of a mobile device capable of automatic enablement of a rear-face data entry in accordance with an embodiment of the invention.

FIG. 2 shows a perspective rear surface view of a mobile device (200) capable of automatic enablement of a rear-face data entry in accordance with an embodiment of the invention. In one embodiment of the invention, a rear surface (211) of the mobile device (200) comprises a rear display unit (209), one or more rear display elevation guards (201), a rear-face data entry interface (205), and a touchpad (207). In a preferred embodiment of the invention, the rear display unit (209) may be a touch-screen display which may utilize liquid-crystal display (LCD), plasma, or OLED (Organic Light Emitting Diode) technology. The touch-screen display is generally configured to receive and recognize contact-based inputs from a user. If the rear display unit (209) is a touch-screen display, then in some embodiments of the invention, the touch-screen display alone can serve as a rear-face data entry interface, typically providing virtual keys, buttons, or a virtual keyboard on its touch-screen menu driven by an application software executed by the mobile device (200). In another embodiment of the invention, the rear display unit (209) may be a non-touch-screen display unit which may be insensitive to contact-based inputs from the user. FIG. 2 also shows one or more front display elevation guards (203A, 203B). Both front and rear display elevation guards (201, 203A, 203B) provide added heights relative to display units and data entry interfaces near each elevation guard, thereby preventing scratches and unintended contacts. These elevation guards can be made from rubber, metal, plastics, or a combination of such materials.

Figure 10:
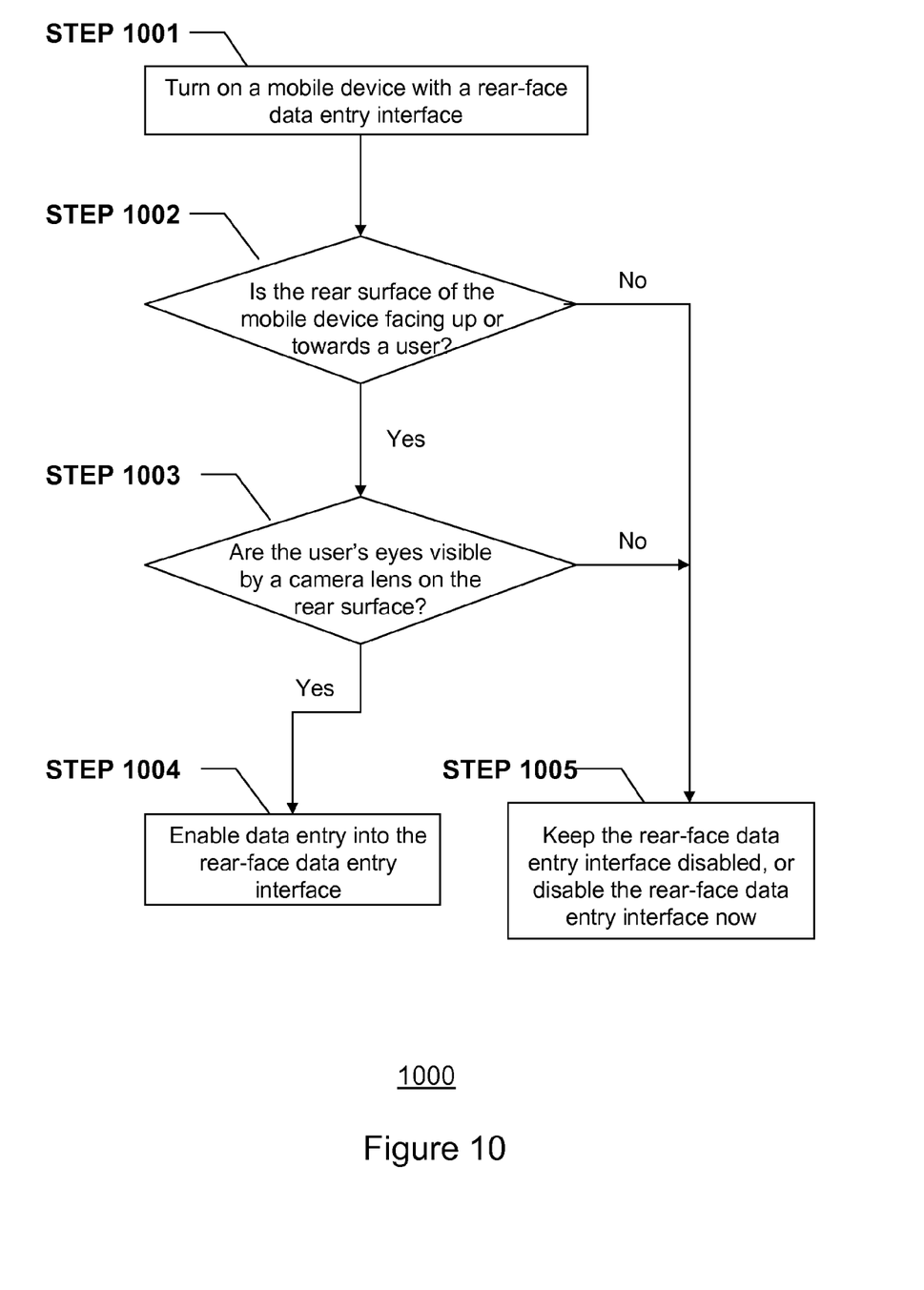
FIG. 10 shows a method for recognizing a user's line of sight with a particular surface of a mobile device using an embedded camera in accordance with an embodiment of the invention.

The rear-face data entry interface (205) shown in FIG. 2 is a physical QWERTY keyboard with a touchpad (207). In a preferred embodiment of the invention, a full-size QWERTY keyboard is a preferred rear-face data entry interface. In an alternate embodiment of the invention, a physical keypad, a virtual keyboard displayed by a touch screen, or other data entry keys or buttons can be utilized on the rear surface (211) of the mobile device as a rear-face data entry interface. Furthermore, an embedded camera with a camera lens may be located on or near the rear surface (211) of the mobile device (200). As illustrated in FIG. 10 and explained in corresponding descriptions, the embedded camera and the camera lens can be utilized to recognize and determine a user's line of sight with the rear surface (211) or another particular surface of the mobile device (e.g. 200) for automatic enablement or disablement of the rear-face data entry interface (205).

The advantage of having the full-size QWERTY keyboard as the rear-face data entry interface (205) is numerous. First, by placing the full-size QWERTY keyboard on the rear surface (211) of the mobile device, a device designer can dedicate the front surface (e.g. FIG. 1) of the mobile device (e.g. 100) to a larger front display unit without crowding valuable front surface real estate of the mobile device (e.g. 100). Second, the device designer does not have to force a user to use a virtual keyboard displayed by a touch-screen front display unit, which is increasingly common on some mobile device designs. The virtual keyboard displayed by the touch-screen front display unit is typically less than a full-size keyboard configuration and inconveniences the user by making touch-typing or all-finger typing difficult. Furthermore, even if the touch-screen front display unit provides an ergonomic virtual keyboard, a classical "typing feel" a user may be familiar with a physical-key-based keyboard is not easily emulated on a touch-screen-based virtual keyboard even with recent introduction of force-feedback or electrically-stimulating touch-screen devices. The lack of classical typing feel potentially increases typos and other usability-related complaints. Third, the full-size QWERTY keyboard on the rear surface (211) of the mobile device (e.g. 100, 200) provides a clear usability benefit for a user who needs a high amount of serious typing into the mobile device. Anytime the user needs a high amount of serious typing, the user can simply "flip" the mobile device (e.g. 100) from the front surface to the rear surface (211) and use the full-size QWERTY keyboard on the rear surface (211).

A main reason for a lack of dedicated QWERTY keyboard on mobile devices today may be at least partly attributed to a potential user inconvenience arising from erroneous and accidental brushing, contact, and pushing of buttons, keys, or touch screens on a rear surface of a mobile device. Conventional methods of preventing accidental entry of information to a data entry interface involve a "manual lock" button or a "manual lock" slider, which locks the mobile device from taking any data entry until the lock is released. This method of accidental data entry prevention is commonly used on a bar-type cellular phone. However, the chances of accidental data entry is significantly higher if a user forgets to activate a manual lock mechanism when both front and rear surfaces integrate data entry interfaces, as shown by a mobile device in FIGS. 1~5.

The present invention alleviates this user inconvenience by integrating a novel and automated rear-face data entry disable and enable mechanism. In particular, a preferred embodiment of the invention integrates an automatic rear-face data entry interface enable/disable sensor, which is capable of detecting whether the rear-face data entry interface is facing-up and/or facing a user's line of sight. In one embodiment of the invention, the automatic rear-face data entry interface enable/disable sensor can be a gyroscopic position sensor which senses whether a rear surface of a mobile device is facing up or down. In another embodiment of the invention, the automatic rear-face data entry interface enable/disable sensor can be an embedded camera on a rear surface or another surface on the mobile device with an application program executed by a CPU of the mobile device, wherein the application program is configured to recognize a particular user's eyes from a camera lens to determine whether the user is in line of sight with the rear surface of the mobile device. Yet in another embodiment of the invention, the automatic rear-face data entry interface enable/disable sensor can be a combination of the gyroscopic position sensor and the embedded camera with a camera lens on the rear surface or another surface on the mobile device to increase accuracy of automatic enable/disable determination for a rear-face data entry interface.

Figure 7:
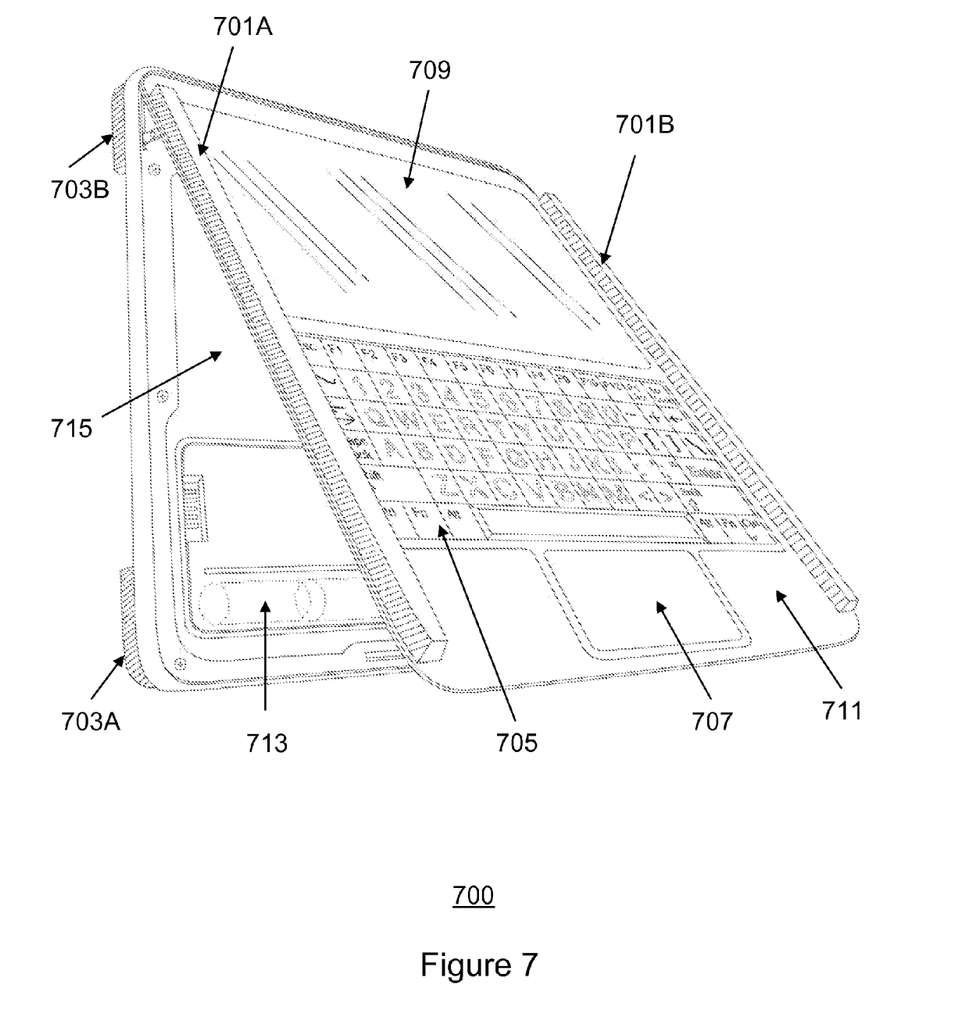
FIG. 7 shows a perspective rear surface view of a mobile device with a rear-cover data entry interface capable of automatic enablement of the rear-cover data entry interface, which can be docked to a main body of the mobile device, in accordance with an embodiment of the invention.

For example, in a preferred embodiment of the invention, if a rear surface (e.g. 211) of the mobile device is facing up and/or faces the user's line of sight, and the automatic rear-face data entry interface enable/disable sensor determines or confirms that this is the case, then the rear-face data entry interface may be automatically enabled for data entry from physical contacts or brushing Furthermore, if the rear surface of the mobile device is not facing up and/or not within the user's line of sight, and the automatic rear-face data entry interface enable/disable sensor determines or confirms that this is the case, then the rear-face data entry interface may be automatically disabled for data entry from physical contacts or brushing. This significantly increases user convenience for using a rear display unit and/or a rear-face data entry interface while minimizing accidental and unintended data entry. It should be noted that these advantages are not limited to the rear-face data entry interface shown in FIGS. 2~5. A rear-cover data entry interface in an alternate embodiment of the invention, as shown in FIG. 7, essentially benefits from all of the advantages described for a rear-face data entry interface.

Figure 3:
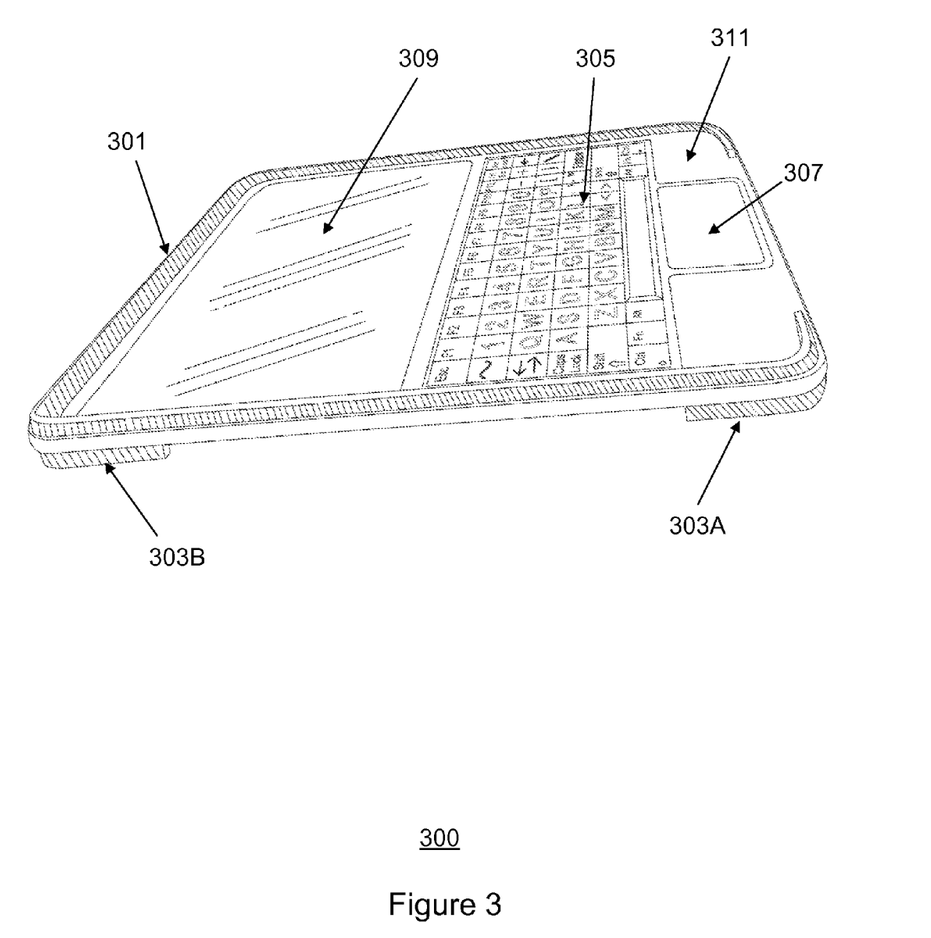
FIG. 3 shows a perspective side surface view of a mobile device capable of automatic enablement of a rear-face data entry in accordance with an embodiment of the invention.

FIG. 3 shows a perspective side and rear surface view of a mobile device (300) capable of automatic enablement of a rear-face data entry in accordance with an embodiment of the invention. In one embodiment of the invention, the side surface is relatively thin and may incorporate external ports (e.g. 109), such as a USB port, an SD port, another I/O port, or a power cord connection port. In this particular embodiment of the invention, a rear display elevation guard (301) surrounds most edges of the rear surface (311) of the mobile device (300) and provide protection against scratches and unintended contacts to a rear display unit (309) and a rear-face data entry interface (305) when the rear surface (311) is facing down on a typically-flat solid surface. By providing an added height relative to the rear display unit (309) and the rear-face data entry interface (305), the rear display elevation guard (301) prevents scratches and unintended contacts on the rear surface (311). The rear display elevation guard (301) can be made from rubber, metal, plastics, or a combination of such materials. Likewise, the one or more front display elevation guards (303A, 303B) provide protection against scratches and unintended contacts to the front display unit when the front surface is facing down on a typically-flat solid surface.

As illustrated in FIG. 3, the rear surface (311) of the mobile device (300) comprises a rear display unit (309), a rear display elevation guard (301), a rear-face data entry interface (305), and a touchpad (307). In a preferred embodiment of the invention, the rear display unit (309) may be a touch-screen display which may utilize liquid-crystal display (LCD), plasma, or OLED (Organic Light Emitting Diode) technology. The touch-screen display is generally configured to receive and recognize contact-based inputs from a user. If the rear display unit (309) is a touch-screen display, then in some embodiments of the invention, the touch-screen display alone can serve as a rear-face data entry interface, typically providing virtual keys, buttons, or a virtual keyboard on its touch-screen menu driven by an application software executed by the mobile device (300). In another embodiment of the invention, the rear display unit (309) may be a non-touch-screen display unit which may be insensitive to contact-based inputs from the user.

Furthermore, the rear-face data entry interface (305) shown in FIG. 3 is a physical QWERTY keyboard with a touchpad (307). In a preferred embodiment of the invention, a full-size QWERTY keyboard is a preferred rear-face data entry interface. In an alternate embodiment of the invention, a physical keypad, a virtual keyboard displayed by a touch screen, or other data entry keys or buttons can be utilized on the rear surface (311) of the mobile device (300) as a rear-face data entry interface.

Figure 4:
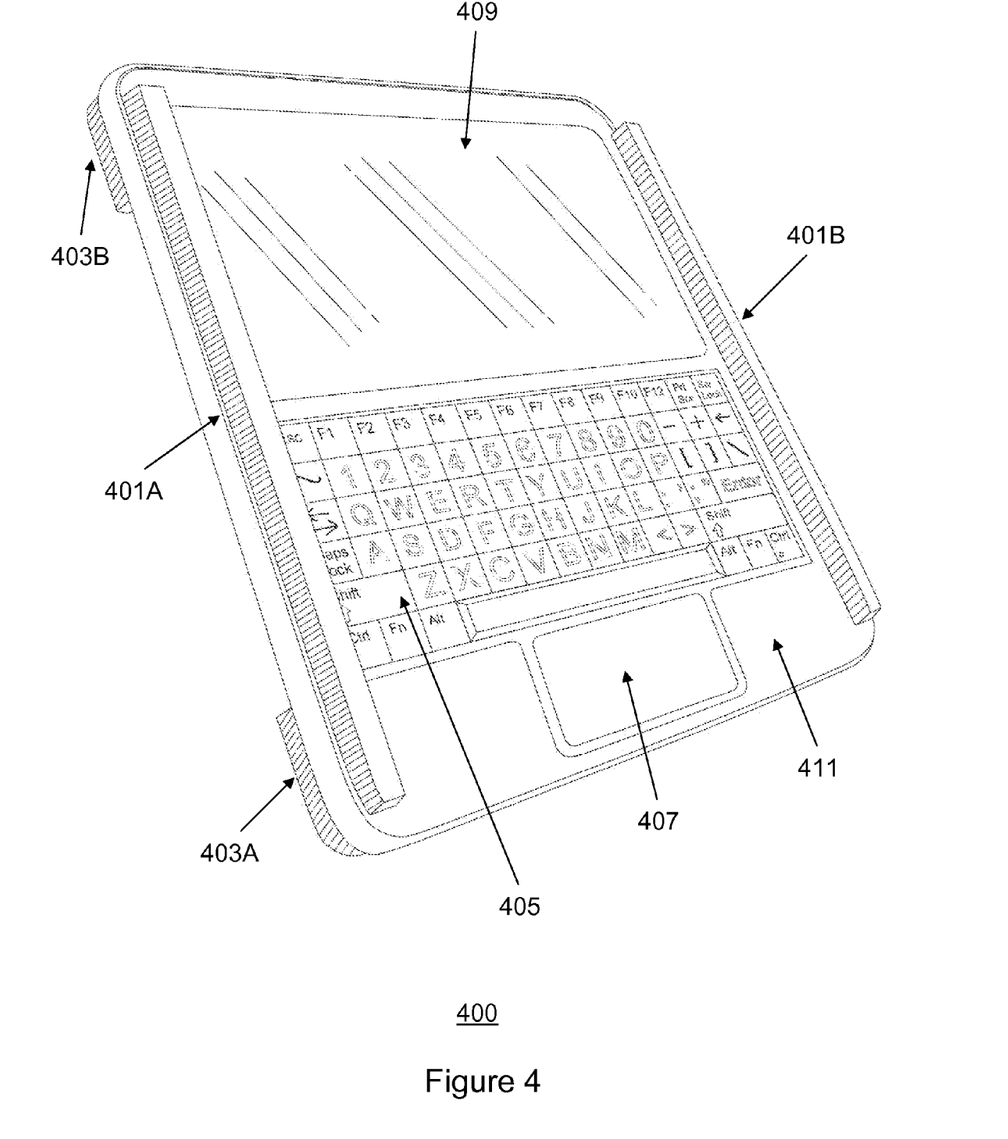
FIG. 4 shows a perspective rear surface view of a mobile device capable of automatic enablement of a rear-face data entry in accordance with an embodiment of the invention.

FIG. 4 shows a perspective rear surface view of a mobile device (400) capable of automatic enablement of a rear-face data entry in accordance with an embodiment of the invention. In one embodiment of the invention, a rear surface (411) of the mobile device (400) comprises a rear display unit (409), two rear display elevation guards (401A, 401B) which are placed on left and right edges, a rear-face data entry interface (405), and a touchpad (407). In a preferred embodiment of the invention, the rear display unit (409) may be a touch-screen display which may utilize liquid-crystal display (LCD), plasma, or OLED (Organic Light Emitting Diode) technology. The touch-screen display is generally configured to receive and recognize contact-based inputs from a user. If the rear display unit (409) is a touch-screen display, then in some embodiments of the invention, the touch-screen display alone can serve as a rear-face data entry interface, typically providing virtual keys, buttons, or a virtual keyboard on its touch-screen menu driven by an application software executed by the mobile device (400). In another embodiment of the invention, the rear display unit (409) may be a non-touch-screen display unit which may be insensitive to contact-based inputs from the user. FIG. 4 also shows one or more front display elevation guards (403A, 403B). Both front and rear display elevation guards (i.e. 403A, 403B, 401A, 401B) provide added heights relative to display units and data entry interfaces near each elevation guard, thereby preventing scratches and unintended contacts. These elevation guards can be made from rubber, metal, plastics, or a combination of such materials.

The rear-face data entry interface (405) shown in FIG. 4 is a physical QWERTY keyboard with a touchpad (407). In a preferred embodiment of the invention, a full-size QWERTY keyboard is a preferred rear-face data entry interface. In an alternate embodiment of the invention, a physical keypad, a virtual keyboard displayed by a touch screen, or other data entry keys or buttons can be utilized on the rear surface (411) of the mobile device as a rear-face data entry interface. Furthermore, an embedded camera with a camera lens may be located on or near the rear surface (411) of the mobile device (400). As illustrated in FIG. 10 and explained in corresponding descriptions, the embedded camera and the camera lens can be utilized to recognize and determine a user's line of sight with the rear surface (411) or another particular surface of the mobile device (e.g. 400) for automatic enablement or disablement of the rear-face data entry interface (405).

Figure 5:
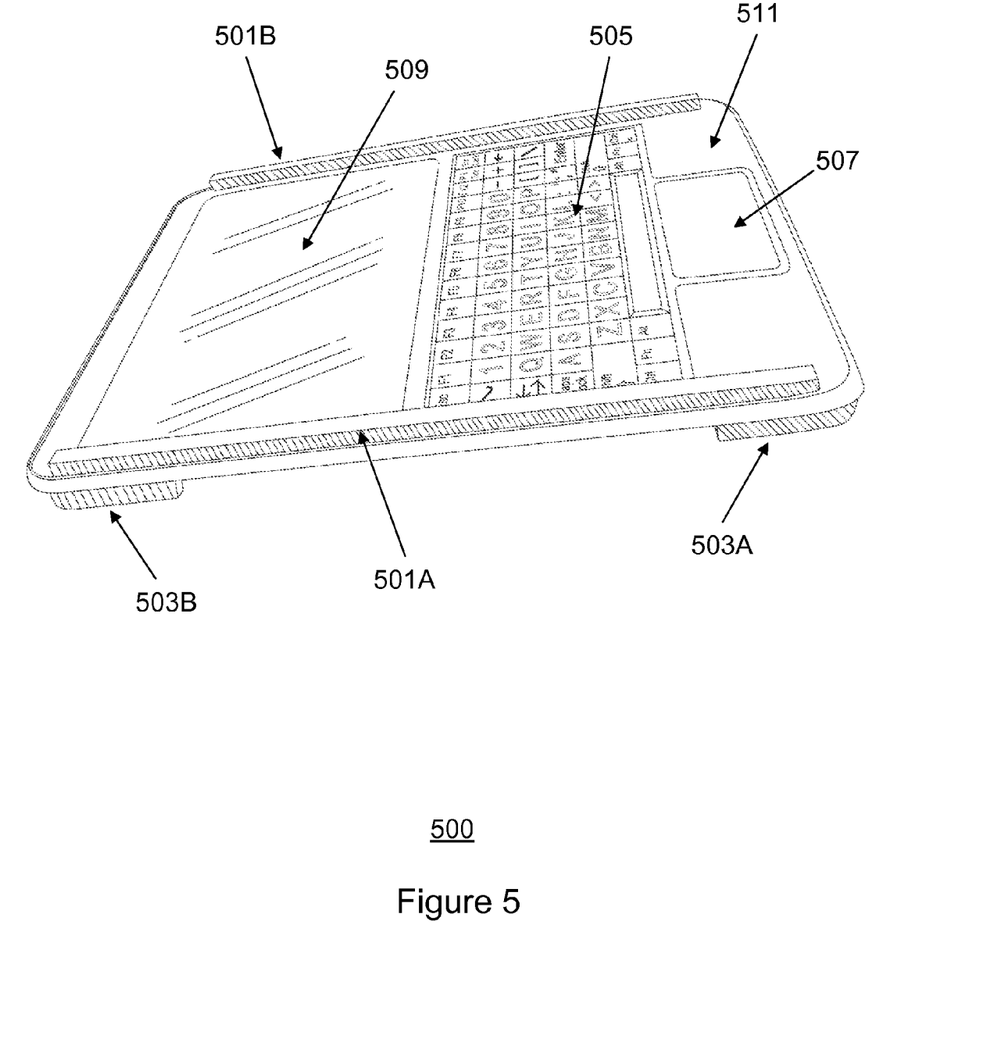
FIG. 5 shows a perspective side surface view of a mobile device capable of automatic enablement of a rear-face data entry in accordance with an embodiment of the invention.

FIG. 5 shows a perspective side surface and rear surface view of a mobile device (500) capable of automatic enablement of a rear-face data entry in accordance with an embodiment of the invention. In one embodiment of the invention, the side surface is relatively thin and may incorporate external ports (e.g. 109), such as a USB port, an SD port, another I/O port, or a power cord connection port. In this particular embodiment of the invention, a left-side rear display elevation guard (501A) and a right-side rear display elevation guard (501B) surround left and right edges of the rear surface (511) of the mobile device (500) and provide protection against scratches and unintended contacts to a rear display unit (509) and a rear-face data entry interface (505) when the rear surface (511) is facing down on a typically-flat solid surface. By providing an added height relative to the rear display unit (509) and the rear-face data entry interface (505), the left-side and right-side rear display elevation guards (501A, 501B) prevent scratches and unintended contacts on the rear surface (511). The left-side and right-side rear display elevation guards (501A, 501B) can be made from rubber, metal, plastics, or a combination of such materials. Likewise, the one or more front display elevation guards (503A, 503B) provide protection against scratches and unintended contacts to the front display unit when the front surface is facing down on a typically-flat solid surface.

As illustrated in FIG. 5, the rear surface (511) of the mobile device (500) comprises a rear display unit (509), left-side and right-side rear display elevation guards (501A, 501B), a rear-face data entry interface (505), and a touchpad (307). In a preferred embodiment of the invention, the rear display unit (509) may be a touch-screen display which may utilize liquid-crystal display (LCD), plasma, or OLED (Organic Light Emitting Diode) technology. The touch-screen display is generally configured to receive and recognize contact-based inputs from a user. If the rear display unit (509) is a touch-screen display, then in some embodiments of the invention, the touch-screen display alone can serve as a rear-face data entry interface, typically providing virtual keys, buttons, or a virtual keyboard on its touch-screen menu driven by an application software executed by the mobile device (500). In another embodiment of the invention, the rear display unit (509) may be a non-touch-screen display unit which may be insensitive to contact-based inputs from the user.

Furthermore, the rear-face data entry interface (505) shown in FIG. 5 is a physical QWERTY keyboard with a touchpad (507). In a preferred embodiment of the invention, a full-size QWERTY keyboard is a preferred rear-face data entry interface. In an alternate embodiment of the invention, a physical keypad, a virtual keyboard displayed by a touch screen, or other data entry keys or buttons can be utilized on the rear surface of the mobile device as a rear-face data entry interface.

Figure 6:
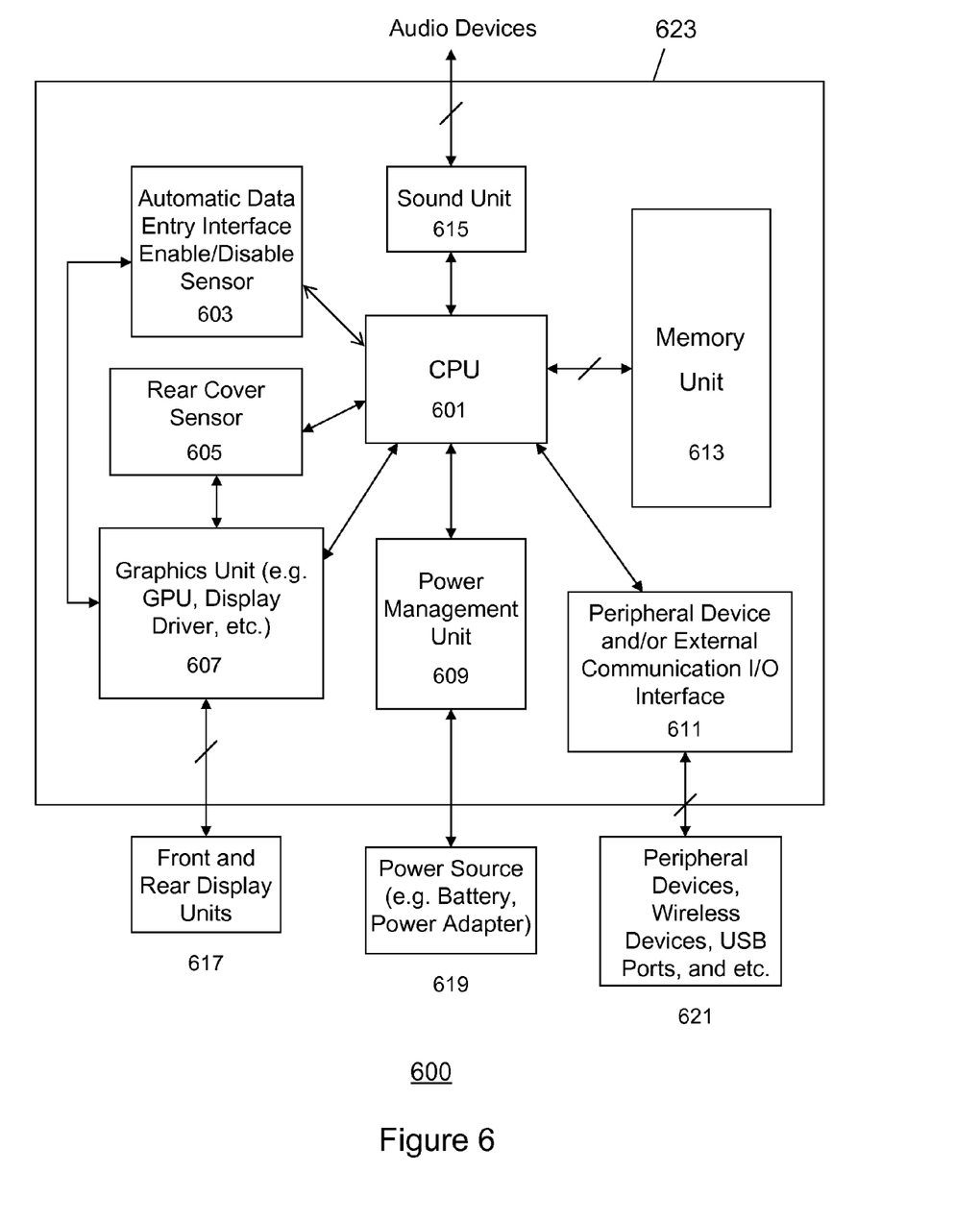
FIG. 6 shows a system block diagram of a mobile device capable of automatic enablement of a rear-face data entry in accordance with an embodiment of the invention.

FIG. 6 shows a system block diagram (600) of mobile device components (623) capable of automatic enablement of a rear-face data entry in accordance with an embodiment of the invention. In a preferred embodiment of the invention, the mobile device has a CPU (601) which is operatively connected to a memory unit (613), an automatic data entry interface enable/disable sensor (603), a rear cover sensor (605), a graphics unit (607) (e.g. a graphics processor, a display driver, and etc.), a power management unit (609), a peripheral device and/or external communication I/O interface (611), and a sound unit (615).

In the preferred embodiment of the invention, the CPU (601) is configured to control each logical unit operatively (i.e. directly or indirectly) connected to the CPU (601). The memory unit (613) typically comprises volatile memory banks based on DRAM's. In some embodiments of the invention, the memory unit (613) may use non-volatile memory technologies such as SRAM's and/or Flash memory. The memory unit (613) is capable of storing programs and applications which can be executed by the CPU (601), the graphics unit (607), or another logical unit operatively connected to the memory unit (613). The power management unit (609) is operatively connected to a power supply unit and a power source (e.g. battery, power adapter) (619), and the power management unit (609) generally controls power supplied to a mobile device and its logical units. Furthermore, the peripheral device and/or external communication I/O interface (611) as shown in FIG. 6 can be operatively connected to one or more peripheral devices, wireless devices, USB ports, and other external data communication media (621).

Continuing with FIG. 6, the system block diagram (600) shows an automatic data entry interface enable/disable sensor (603), which is capable of detecting whether a data entry interface (e.g. a rear-face data entry interface shown in FIGS. 2-5, a rear-cover data entry interface shown in FIG. 7, and etc.) is facing-up and/or facing a user's line of sight. For example, the automatic data entry interface enable/disable sensor (603) may be able to detect whether a full-size keyboard (i.e. a type of a data entry interface) on a rear surface of a mobile device is facing-up and/or facing the user's line of sight. The automatic data entry enable/disable sensor (603) may be a gyroscopic position sensor, an embedded camera with a camera lens on or near the rear surface of the mobile device, a touch sensor, or any combination of the listed devices and other appropriate devices. In a preferred embodiment of the invention, the automatic data entry interface enable/disable sensor (603) disables a data entry interface if the rear surface of the mobile device is not facing-up and/or not facing the user's line of sight. Conversely, the automatic data entry interface enable/disable sensor (603) enables the data entry interface if the rear surface of the mobile device is facing-up and/or facing the user's line of sight.

Furthermore, in one embodiments of the invention, a rear cover sensor (605) may be one of the mobile device components (623) in the mobile device, wherein the rear cover sensor (605) is configured to detect whether a rear-cover data entry interface is docked into a main body of the mobile device or not. As an example of using the rear cover sensor (605), if the rear cover sensor (605) determines that the rear-cover data entry interface is not docked into the main body, then the mobile device may disable data entry and related programs or features on the rear-cover data entry interface. If the rear cover sensor (605) determines that the rear-cover data entry interface is docked into the main body, then the mobile device may at least activate the automatic data entry interface enable/disable sensor (603) to further determine whether the rear surface of the mobile device is facing up and/or facing the user's line of sight for automatic enablement of the rear-cover data entry interface.

As shown in FIG. 6, in a preferred embodiment of the invention, the graphics unit (607) may comprise a graphics processor, a display driver, a dedicated graphics memory unit, and/or another graphics-related logical components. In general, the graphics unit (607) is able to process and communicate graphics-related data with the CPU (601), the display driver, and/or the dedicated graphics memory unit. The graphics unit (607) is also operatively connected to front and rear display units (617). In addition, the CPU (601) may be operatively connected to the sound unit (615) which contains audio-related logical components for generation or recording of audio data from the mobile device.

FIG. 7 shows a perspective rear view of a mobile device (700) with a rear-cover data entry interface (705) capable of automatic enablement of the rear-cover data entry interface, which can be docked to a main body (715) of the mobile device (700), in accordance with an embodiment of the invention. In one embodiment of the invention, a rear-cover surface (711) of the mobile device (700) comprises a rear display unit (709), two rear display elevation guards (701A, 701B) which are placed on left and right edges, a rear-cover data entry interface (705), and a touchpad (707). In a preferred embodiment of the invention, the rear display unit (709) is integrated into the rear-cover surface (711) and may be a touch-screen display which may utilize liquid-crystal display (LCD), plasma, or OLED (Organic Light Emitting Diode) technology. The touch-screen display is generally configured to receive and recognize contact-based inputs from a user. If the rear display unit (709) is a touch-screen display, then in some embodiments of the invention, the touch-screen display alone can serve as a rear-cover data entry interface, typically providing virtual keys, buttons, or a virtual keyboard on its touch-screen menu driven by an application software executed by the mobile device (700). In the preferred embodiment of the invention, the rear-cover data entry interface (705), the rear display unit (709), and the touchpad (707) are integrated into the surface (711) of the rear-cover, which is configured to dock into the main body (715) of the mobile device (700). The rear-cover can also act as a battery cover for a battery pack (713) underneath. In one embodiment of the invention, the battery pack (713) may be placed in a separate housing of the main body (715) as shown in FIG. 7. In another embodiment of the invention, the battery pack (713) may be attached to a rear-cover itself and are configured to dock into the main body (715) along with the rear-cover data entry interface (705) and other units which are integrated into the rear-cover surface (711).

In another embodiment of the invention, the rear display unit (709) may be part of a rear surface on the main body (715) instead of being part of the rear-cover surface (711). In this embodiment of the invention, the rear-cover data entry interface (705) is part of the rear-cover surface (711), which is configured to dock into the main body (715) of the mobile device (700), but the rear display unit (709) is fixed on the rear surface of the main body (715).

In another embodiment of the invention, the rear display unit (709) may be a non-touch-screen display unit which may be insensitive to contact-based inputs from the user. The non-touch-screen display unit may be either attached to a rear surface of the main body (715) or somewhere on the rear-cover surface (711).

FIG. 7 also shows one or more front display elevation guards (703A, 703B). Both front and rear display elevation guards (701A, 701B, 703A, 703B) provide added heights relative to display units and data entry interfaces near each elevation guard, thereby preventing scratches and unintended contacts. These elevation guards can be made from rubber, metal, plastics, or a combination of such materials.

The rear-cover data entry interface (705) shown in FIG. 7 is a physical QWERTY keyboard with a touchpad (707). In a preferred embodiment of the invention, a full-size QWERTY keyboard is a preferred rear-cover data entry interface. In an alternate embodiment of the invention, a physical keypad, a virtual keyboard displayed by a touch screen, or other data entry keys or buttons can be utilized on the rear-cover surface (711) of the mobile device as a rear-cover data entry interface. Furthermore, an embedded camera with a camera lens may be located on or near the rear-cover surface (711) of the mobile device (700). As illustrated in FIG. 10 and explained in corresponding descriptions, the embedded camera and the camera lens can be utilized to recognize and determine a user's line of sight with the rear-cover surface (711) or another particular surface of the mobile device (e.g. 700) for automatic enablement or disablement of the rear-cover data entry interface (705).

Furthermore, in one embodiment of the invention, the rear-cover data entry interface (705) may be powered by its own battery pack and be operational even as a separate unit from the main body (715) of the mobile device (700). In this embodiment of the invention, the rear-cover data entry interface (705) may be able to communicate with the main body (715) wirelessly using wireless LAN, Bluetooth, or other wireless protocols. The rear-cover data entry interface (705) is generally designed to dock into the main body (715) of the mobile device (700) and form at least part of the rear surface of the mobile device (700) when the rear-cover data entry interface (705) is properly docked into the main body (715).

Figure 8:
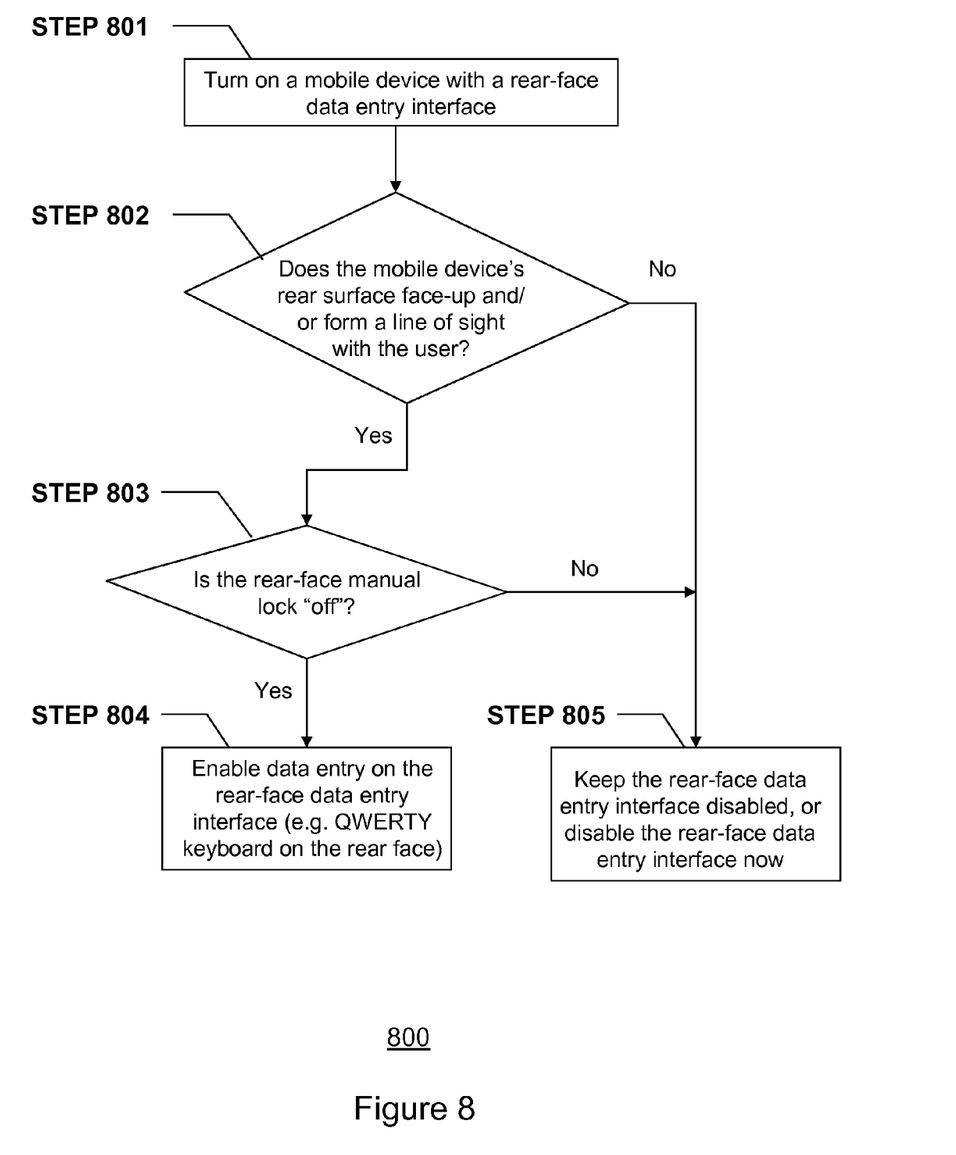
FIG. 8 shows a method for automatically enabling a rear-face data entry interface for a mobile device in accordance with an embodiment of the invention.

FIG. 8 shows a method for automatically enabling a rear-face data entry interface for a mobile device in accordance with an embodiment of the invention. In STEP 801, a user turns the power on for a mobile device with a rear-face data entry interface. Then, in STEP 802, the mobile device can then either constantly, periodically, or routinely check whether the mobile device's rear surface is facing up (i.e. as opposed to facing down) and/or form a line of sight with the user. In one embodiment of the invention, a determination of whether the rear surface is in the line of sight with the user may require a visual detection sensor such as an embedded camera with a camera lens on or near the rear surface of the mobile device. An application program with an object-recognition capability can specifically search for and recognize the presence of the user's eyes within visual field of the camera lens, which may indicate that the user is in the line of sight with the rear surface. This "line-of-sight-with-the-user" recognition application program may be automatically loaded into a memory unit of the mobile device during a device boot-up, so that the camera lens is ready to search and recognize the user's eyes within its visual field readily after a startup booting routine of the mobile device during power-up.

In another embodiment of the invention, a simple determination of whether the rear surface is facing up may be sufficient to justify enabling or disabling a rear-surface data entry interface. In this case, the mobile device may simply require a gyroscopic position sensor to detect the current orientation of the rear-surface data entry interface. Yet in another embodiment of the invention, the determination of whether the rear surface is facing up (i.e. as opposed to facing down) and form a line of sight with the user may be more fine-tuned by using a combination of the gyroscopic position sensor, the embedded camera with the camera lens on or near the rear surface of the mobile device, and the "line-of-sight-with-the-user" recognition application program. Other sensors may also be used as a component of an "automatic data entry interface enable/disable sensor" unit. This multiple sensor approach may lower erroneous automatic enable/disable rates for the rear-face data entry interface.

Continuing with FIG. 8, if the mobile device's rear surface is determined to be facing up and/or form a line of sight with the user, then as shown in STEP 803, if the rear-face manual lock (i.e. an optional feature) is in "off" position, the mobile device can enable data entry on the rear-face data entry interface, as shown in STEP 804. This automatic enablement of data entry provides substantial user convenience by eliminating the need of activating or deactivating the rear-face manual lock for data entry when the user is using flipping around various surfaces of the mobile device. Therefore, the rear-face manual lock may become a less frequently-used and optional feature for a typical mobile device user. Types of rear-face data entry interface include, but are not limited to, a QWERTY keyboard, a keypad, or a touch-screen keyboard.

If the mobile device's rear surface is determined to be not facing-up and/or not forming a line of sight with the user, then the mobile device can keep the rear-face data entry interface disabled, or disable the rear-face data entry interface if it is not already disabled, as shown in STEP 805. This automatic disablement of the rear-face data entry interface prevents accidental and unintended entry of data through unwanted contacts and brushing against the rear-face data entry interface.

Figure 9:
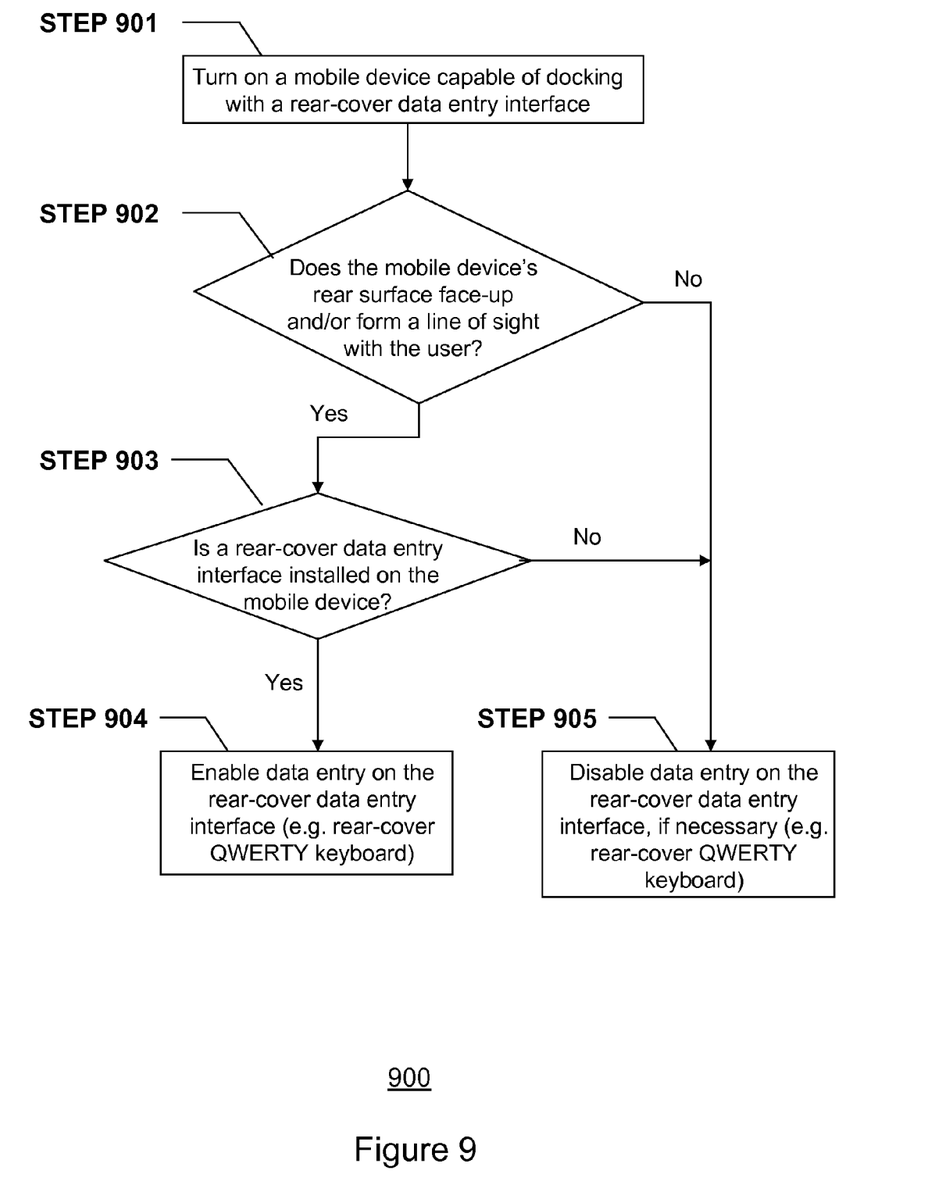
FIG. 9 shows a method for automatically enabling a rear-cover data entry interface for a mobile device in accordance with an embodiment of the invention.

FIG. 9 shows a method for automatically enabling a rear-cover data entry interface for a mobile device in accordance with an embodiment of the invention. In STEP 901, a user turns the power on for a mobile device with a rear-cover data entry interface. Then, in STEP 902, the mobile device can then either constantly, periodically, or routinely check whether the mobile device's rear surface is facing up (i.e. as opposed to facing down) and/or form a line of sight with the user. In one embodiment of the invention, a determination of whether the rear surface is in the line of sight with the user may require a visual detection sensor such as an embedded camera with a camera lens on or near the rear surface of the mobile device. An application program with an object-recognition capability can specifically search for and recognize the presence of the user's eyes within visual field of the camera lens, which may indicate that the user is in the line of sight with the rear surface. This "line-of-sight-with-the-user" recognition application program may be automatically loaded into a memory unit of the mobile device during a device boot-up, so that the camera lens is ready to search and recognize the user's eyes within its visual field readily after a startup booting routine of the mobile device during power-up.

In another embodiment of the invention, a simple determination of whether the rear surface is facing up may be sufficient to justify enabling or disabling a rear-surface data entry interface. In this case, the mobile device may simply require a gyroscopic position sensor to detect the current orientation of the rear-surface data entry interface. Yet in another embodiment of the invention, the determination of whether the rear surface is facing up (i.e. as opposed to facing down) and form a line of sight with the user may be more fine-tuned by using a combination of the gyroscopic position sensor, the embedded camera with the camera lens on or near the rear surface of the mobile device, and the "line-of-sight-with-the-user" recognition application program. Other sensors may also be used as a component of an "automatic data entry interface enable/disable sensor" unit. This multiple sensor approach may lower erroneous automatic enable/disable rates for the rear-cover data entry interface.

Continuing with FIG. 9, if the mobile device's rear surface is determined to be facing up and/or form a line of sight with the user, then as shown in STEP 903, if the rear-cover data entry interface is installed on the mobile device, the mobile device can enable data entry on the rear-cover data entry interface, as shown in STEP 904. This automatic enablement of data entry provides substantial user convenience by eliminating the need of activating or deactivating a rear-cover manual lock for data entry when the user is using flipping around various surfaces of the mobile device. Therefore, a rear-cover manual lock may become a less frequently-used and optional feature for a typical mobile device user. Types of rear-cover data entry interface include, but are not limited to, a QWERTY keyboard, a keypad, or a touch-screen keyboard.

If the mobile device's rear surface is determined to be not facing-up and/or not forming a line of sight with the user, or if the rear-cover data entry interface is not installed on the mobile device, then the mobile device can keep the rear-cover data entry interface disabled, or disable the rear-cover data entry interface if it is not already disabled, as shown in STEP 905. This automatic disablement of the rear-cover data entry interface prevents accidental and unintended entry of data through unwanted contacts and brushing against the rear-cover data entry interface.

FIG. 10 shows a method for recognizing a user's line of sight with a particular surface of a mobile device using an embedded camera in accordance with an embodiment of the invention. In STEP 1001, a user turns the power on for a mobile device with a rear-face data entry interface. Then, as shown in STEP 1002, the mobile device can determine whether the rear surface of the mobile device is facing up or towards a user by using a position gyroscopic sensor embedded in the mobile device with a corresponding application software. If the rear surface of the mobile device is facing up or towards a user, then the mobile device can then either constantly, periodically, or routinely check whether the mobile device's rear surface is forming a line of sight with the user by using a camera lens and a corresponding object recognition software designed to detect the presence of user's eyes in the visual field of the camera lens, as shown in STEP 1003. The object recognition software operatively connected to the camera lens can specifically search for and recognize the presence of the user's eyes within visual field of the camera lens, which may indicate that the user is in the line of sight with the rear surface. This "line-of-sight-with-the-user" recognition application program may be automatically loaded into a memory unit of the mobile device during a device boot-up, so that the camera lens is ready to search and recognize the user's eyes within its visual field readily after a startup booting routine of the mobile device during power-up.

As shown in STEP 1004, if the object recognition software and the camera lens detects and recognizes the presence of user's eyes within its visual field, then the mobile device may automatically enable data entry into the rear-face data entry interface. On the other hand, if the rear surface of the mobile device is not facing up and/or not visible within the visual field of the camera lens, as shown in STEP 1005, then the mobile device can keep the rear-face data entry interface disabled, or disable the rear-face data entry interface if it is not already disabled.

The present invention in various embodiments as described for FIGS. 1~10 provides a significant advantage. In particular, the automatic enablement of a rear-face or rear-cover data entry in a mobile device as disclosed in the present invention helps to reduce accidental and unintended data entry into the rear-face or rear-cover data entry interface because the main reason for a lack of dedicated rear-face or rear-cover data entry interface (e.g. a rear-face QWERTY keyboard) on mobile devices today may be at least partly attributed to a potential user inconvenience arising from erroneous and accidental brushing, contact, and pushing of buttons, keys, or touch screens on a rear surface of a mobile device. Conventional methods of preventing accidental entry of information to a data entry interface involve a "manual lock" button or a "manual lock" slider, which locks the mobile device from taking any data entry until the lock is released. This method of accidental data entry prevention is commonly used on a bar-type cellular phone, for example. However, the chances of accidental data entry is substantially higher if both front and rear surfaces integrate data entry interfaces, when the manual lock mechanism is mistakenly not activated for one side of a mobile device.

By integrating a novel and automated rear-face or rear-cover data entry disable and enable mechanism and a related method, various embodiments of the present invention alleviate this user inconvenience. For example, in a preferred embodiment of the invention, if a rear surface (e.g. 211) of the mobile device is facing up and/or faces the user's line of sight, and the automatic rear-face or rear-cover data entry interface enable/disable sensor determines or confirms that this is the case, then the rear-face or the rear-cover data entry interface may be automatically enabled for data entry from physical contacts or brushing. Furthermore, if the rear surface of the mobile device is not facing up and/or not within the user's line of sight, and the automatic rear-face or rear-cover data entry interface enable/disable sensor determines or confirms that this is the case, then the rear-face or the rear-cover data entry interface may be automatically disabled for data entry from physical contacts or brushing. This significantly increases user convenience for using a rear display unit and/or a rear-face or rear-cover data entry interface while minimizing accidental and unintended data entry.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A mobile device capable of automatic enablement of a rear-face data entry, the mobile device comprising:
    a CPU and a memory unit operatively connected to the CPU;
    a graphics unit operatively connected to the CPU;
    a non-transparent front display unit operatively connected to the graphics unit;
    a non-transparent rear display unit operatively connected to the graphics unit;
    a dockable and removable rear-face data entry interface incorporating a physical keyboard;
    an automatic rear-face data entry interface enable/disable module comprising a gyroscopic sensor and an eye movement tracking program executed on the CPU, wherein the gyroscopic sensor determines whether the dockable and removable rear-face data entry interface is facing-up, and the eye movement tracking program in association with a camera lens determines whether a user's eyes are aligned to the physical keyboard on the dockable and removable rear-face data entry interface, so that the automatic rear-face data entry interface enable/disable module prevents an accidental user input into the physical keyboard on the dockable and removable rear-face data entry interface by automatically disabling the physical keyboard from the accidental user input, when and if the gyroscopic sensor determines the physical keyboard on the dockable and removable rear-face data entry interface to be not facing-up, while the eye movement tracking program, in a simultaneous timeframe of a rear-face face-up position determination from the gyroscopic sensor, synchronously determines that the user's eyes are not aligned to the physical keyboard on the dockable and removable rear-face data entry interface; and
    a rear cover sensor that detects whether the dockable and removable rear-face data entry interface is currently docked into a main body of the mobile device, wherein the rear cover sensor requests the CPU to activate the automatic rear-face data entry interface enable/disable module only when the dockable and removable rear-face entry interface is currently docked, and wherein the rear cover sensor requests the CPU to deactivate the automatic rear-face data entry interface enable/disable module when the dockable and removable rear-face entry interface is not currently docked in the main body of the mobile device.

2. The mobile device of claim 1, further comprising one or more front display elevation guards attached to a front surface of the mobile device, wherein the one or more front display elevation guards elevate the non-transparent front display unit from a flat surface when the non-transparent rear display unit is facing up.

3. The mobile device of claim 1, further comprising one or more rear display elevation guards attached to the dockable and removable rear-face data entry interface, the non-transparent rear display unit, and/or a portion of a rear surface of the mobile device, wherein the one or more rear display elevation guards elevate the non-transparent rear display unit from a flat surface when the non-transparent front display unit is facing up.

4. The mobile device of claim 1, further comprising a power management unit, a peripheral device and/or external communication input/output interface, and a power source.

5. The mobile device of claim 1, wherein the physical keyboard is a QWERTY keyboard.

6. The mobile device of claim 1, wherein the dockable and removable rear-face data entry interface incorporates a touchpad, a pointer stick, a mouse, or another mouse pointer-operating device.

* * * * *